Figure 1:
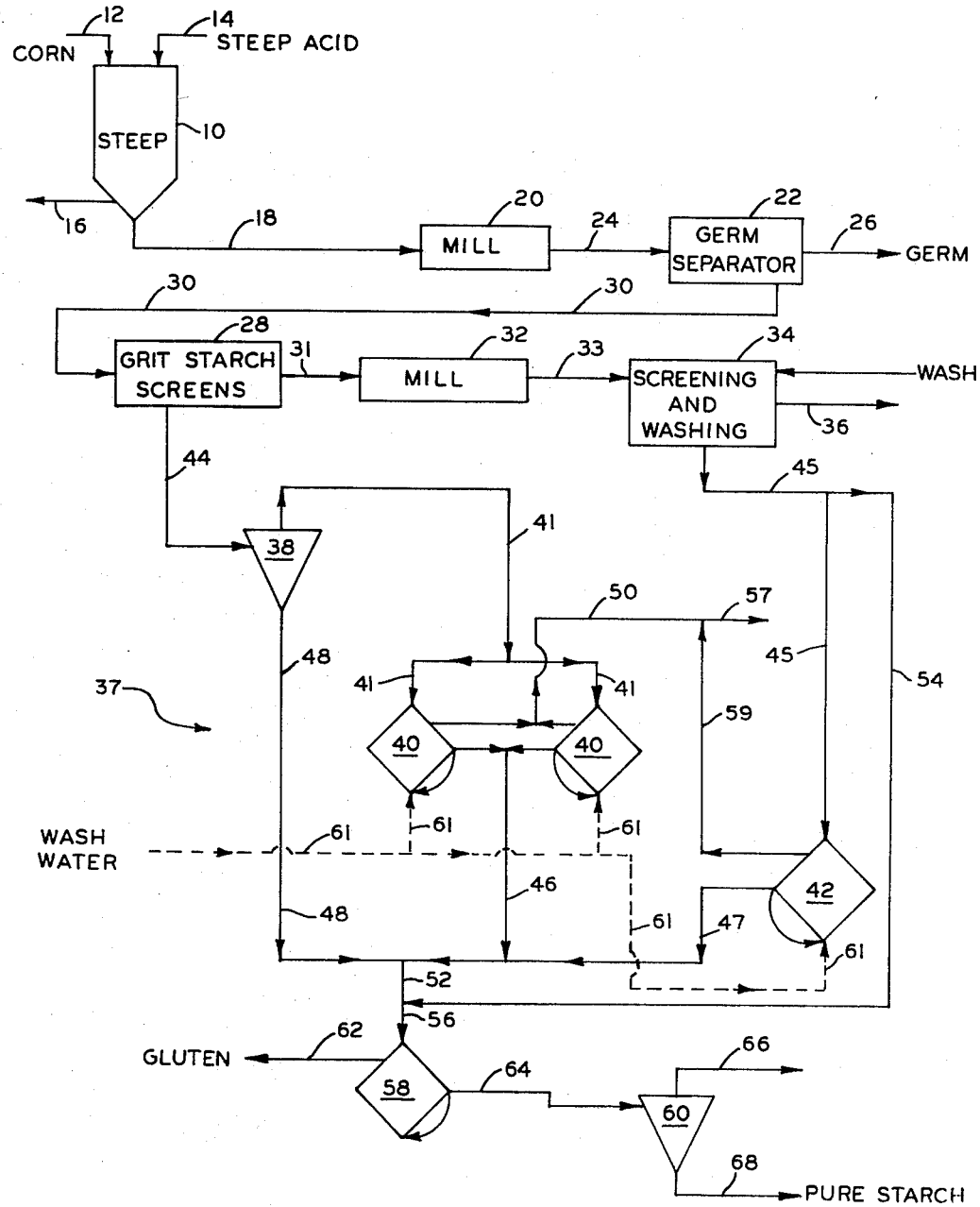

INVENTORS.
ROBERT W. HONEYCHURCH
PAUL L. STAVENGER
JAMES C. ELSKEN
GEORGE EHINGER
KARL P. HETZLER

BY *Earle R. Marden, Jr.*
ATTORNEY.

INVENTORS.
ROBERT W. HONEYCHURCH
PAUL L. STAVENGER
JAMES C. ELSKEN
GEORGE EHINGER
KARL P. HETZLER
BY
Earle R. Morden, Jr.
ATTORNEY.

United States Patent Office  
3,251,717  
Patented May 17, 1966

3,251,717
STARCH MANUFACTURING PROCESS
Robert W. Honeychurch, Stamford, Paul L. Stavenger, Westport, and James C. Elsken, Stamford, Conn., and George Ehinger, Elmhurst, and Karl P. Hetzler, Park Forest, Ill., assignors to Dorr-Oliver Incorporated, Stamford, Conn., a corporation of Delaware
Filed Oct. 15, 1962, Ser. No. 230,359
10 Claims. (Cl. 127—68)

This invention relates generally to improvements in the manufacture of starch by the wet method and more particularly to an improved wet-method, cornstarch process wherein the mill stream is more efficiently and economically concentrated.

It is well known in the field that a more efficient separation of the starch from the gluten contained in the mill stream may be accomplished by thickening the stream prior to the primary starch-gluten separation station. This thickening of the mill stream is commonly referred to as "mill stream thickening" and will be referred to as such hereinafter.

In most plants which employ mill stream thickening a plurality of filters are employed for such purposes. In this type of operation the grit starch stream which is extracted in the grit starch screening operation, is concentrated since this stream contains a high percentage of undesirable solubles. The fiber starch stream, which is extracted after a subsequent milling of the tailings from the grit starch screening operation, is employed to re-slurry the filter cake and to control the specific gravity of the starch-gluten stream supplied to the primary separators from the mill stream thickening portion of the process.

Prior to this invention it has been proposed to substitute centrifuges for mill stream thickening filters. The use of centrifuges in the mill stream thickening portion of the process would provide greater ease of the automatic control of the thickening process, a more sanitary installation and product, lower installation cost for the same result, and lower maintenance requirements. The big disadvantage in the use of centrifuges in this type of operation is that the power consumption is high since the solids content in the grit starch stream is high. High solids content requires the consumption of a very high amount of power by virtue of the fact that these solids must be accelerated and discharged through the nozzles of the centrifuge. Therefore, prior to this invention, the use of centrifuges for mill stream thickening has not been widespread due to the disadvantage of high power consumption which has outweighed the inherent advantages of centrifuges.

It is therefore an object of the invention to provide an improved starch wet milling process in which the feed to centrifuges in a mill stream thickening station has a low solids content in order to permit economical and efficient use of such centrifuges.

A second object of the invention is to provide an improved starch wet milling process in which centrifuges are economically and efficiently employed in the mill stream thickening station to remove a high percentage of solubles from the stream and to provide a constant feed concentration for the starch-gluten primary separation station.

Another object of the invention is to provide a starch wet milling process in which the grit starch is separated in hydrocyclones to supply a high-solubles, low-solids overflow to mill stream thickening centrifuges in order to economically operate the centrifuges.

A still further object of the invention is to provide a starch wet milling process in which a combination of hydrocyclones and centrifuges are employed in a mill stream thickening station to remove economically the soluble material in the mill stream and to supply a constant solids concentration feed to the starch-gluten separation station.

A fifth object of the invention is to provide an improved mill stream thickening station in a starch wet milling process wherein the fiber starch stream is thickened and passed directly to a second stage of the primary starch-gluten separation station thereby reducing the capacity requirements of a first stage of the separation station.

Figure 2:
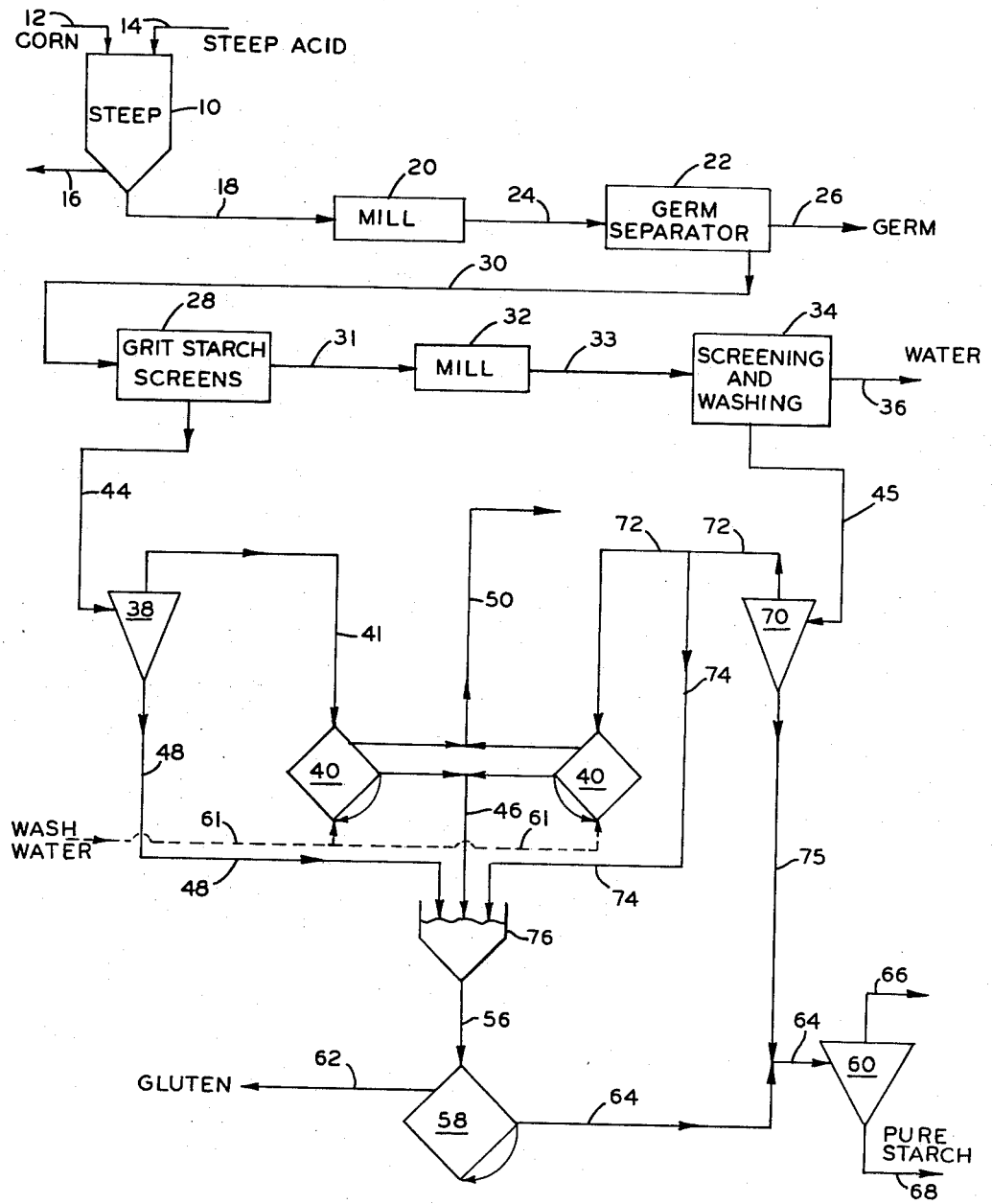

Other objects and advantages of our invention will become apparent as the specifications proceed to describe the invention in which;

FIGURE 1 is a flow sheet of a form of the invention;
FIGURE 2 is a flow sheet showing a modification of the invention and
FIGURE 3 is a flow sheet illustrating a further modification of the invention.

Figure 3:
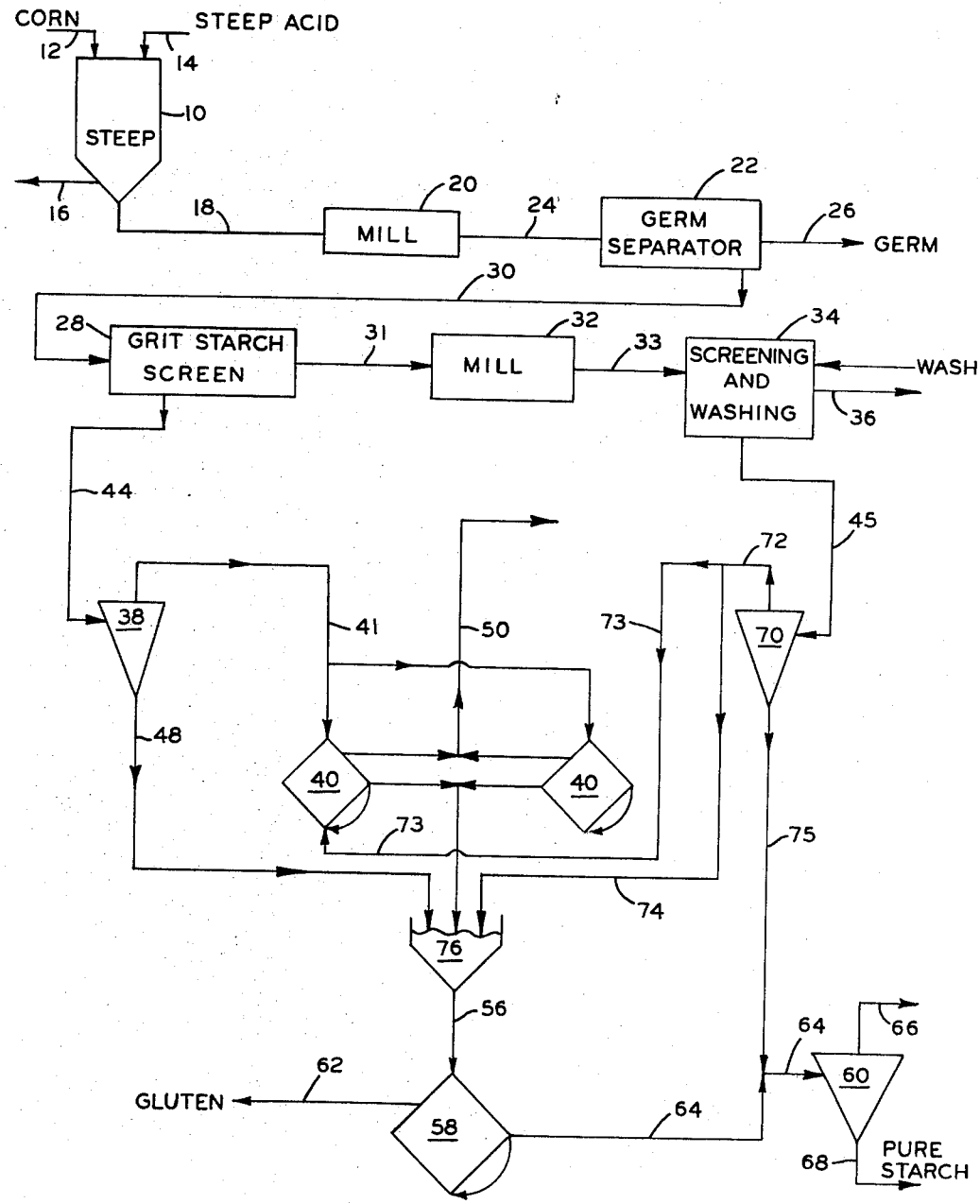

Looking now more specifically to FIGURES 1 to 3, the invention is shown as applied to a corn starch wet milling process. The corn starch wet milling process is only exemplary since the disclosed invention is fully applicable to any starch wet milling process in which it is desired to employ mill stream thickening.

In FIGURES 1 to 3 the apparatus shown schematically is merely illustrative since in practice a number of units in parallel will be employed where a single unit is shown in the drawing. The number of such units used in parallel being dependent upon the size of plant involved and the efficiency required at the particular station in the process.

In FIGURES 1 to 3 the numeral 10 designates one of the tanks of the steeping system which ordinarily consists of a plurality of steeping tanks arranged for counter-current operation. The shelled corn and steeping acid is introduced into the steeping tank at 12 and 14, respectively and the steep water is drawn off at 16 and sent to the evaporator for recovery of soluble substance. The steeped corn from the tanks 10 is then passed via a conduict 18 to an attrition mill 20 to break up the steeped corn and to free the germ. From the attrition mill 20 the milled steeped corn is passed to a germ separation station 22 by a conduit 24 where the germ is separated and passed by a conduit 26 to a germ processing station (not shown) where it is screened, washed, dewatered, dried and the oil recovered. The underflow from the germ separation station 22 is conducted to the grit starch screens 28 via a conduit 30 where it is screened to remove the starch, commonly called grit starch, released in the milling operation 20. The grit screen tailing from the grit starch screens 28 are conducted via a conduit 31 to Buhr mills 32 or other suitable disintegrators. From the mills 32 the ground grit screen tailings are passed by conduit 33 to a screening and washing station 34 where the starch milk (fibre starch) is separated from the coarse and fine fiber by multistage screening and counter current washing. The fibre containing overflow from the screening and washing station is conducted to a processing station (not shown) by a conduit 36 for further processing.

In the embodiment of FIGURE 1, a mill stream thickening station 37 operates on a grit starch stream 44 and on a fiber starch stream 45 from the grit starch screens 28 and the screening and washing station 34, respectively, to remove soluble-bearing water from the mill starch and to produce a supply of thickened mill starch of controlled concentration to the primary starch-gluten separation station. The mill stream thickening station 37 consists basically of a combination of hydrocyclones 38 and centrifuges 40 and 42.

By way of example, values for a specific installation of the present invention are set forth below. Thus, in FIGURE 1, grit starch underflow from the grit starch screen 28 (1000 g.p.m. at a specific gravity of 8.5° Bé., 100° F.) is pumped to hydrocyclones 38 via a conduit 44. Hydrocyclones 38 are any well known type such as that shown in U.S. Patent No. 2,642,185, Fontein, June 16, 1953. Hydrocyclones 38 deliver the light fraction overflow slurry (765 g.p.m. and at a low specific gravity of approximately 3.5° Bé., 100° F.) thru a conduit 41 as a feed to a multiplicity of nozzle type centrifuges 40 generally similar to that shown in U.S. Patent No. 2,917,228, Lewis, December 15, 1959. This slurry consists basically of gluten, starch and water. The underflow slurry 46 from centrifuges 40 (157 g.p.m. at approximately 18° Bé., 100° F.) is combined with the underflow slurry 48 from the hydrocyclones 38 (235 g.p.m. at approximately 21° Bé., 100° F.) for feed to the primary starch-gluten separation station. The centrifuge overflow stream 50 (608 g.p.m. of soluble bearing water containing residual gluten, starch, and solubles) is directed back to the steeping end of the system. At the same time a portion of the underflow fiber starch stream 45 from screening and washing station 34 (425 g.p.m. out of the 1122 g.p.m. total underflow) is delivered to nozzle type centrifuge 42 as a feed. The underflow stream 47 from the centrifuges 42 (97 g.p.m. at approximately 18° Bé., 100° F.) is combined with the underflow streams 48 and 46 from the hydrocyclones 38 and the centrifuges 40 to provide a combined starch-gluten stream 52 being supplied to the primary starch-gluten separation station (489 g.p.m. at a specific gravity of approximately 19.5° Bé.). Since the specific gravity of this stream is too high to obtain top separation efficiency in centrifuges 58 of the primary separation station, the remainder of the fiber starch underflow from the screening and washing station 34 (697 g.p.m. at a specific gravity of 4.5° Bé., 100° F.) is added via conduit 54 to the combined underflow streams from the hydrocyclones 38 and centrifuges 40 and 42 to provide a final starch-gluten stream feed 56 to the primary separating centrifuge 58 (1186 g.p.m. at a specific gravity of approximately 11° Bé., 100° F.) The overflow stream 59 from the centrifuge 42 (328 g.p.m.) is combined with the overflow stream 50 from the centrifuge 40 (608 g.p.m.) to give a combined waste stream 57 (936 g.p.m.). Displacement wash water is supplied to centrifuges 40 and 42 via a conduit 61 to wash the gluten and starch particles to remove impurities therefrom. Preferably, process water is employed to perform this displacement washing operation. Process water is defined as any water in the process which has a lower solubles content than the grit starch stream 44.

Preferably the thickened starch-gluten stream 56 is fed to a primary separation station consisting of a first stage of centrifuges 58 and a second stage of hydrocyclones 60. Centrifuges 58 provide the basic separation of the gluten from the starch. The gluten overflow stream 62 is passed to a gluten thickening station (not shown) for further processing. The starch underflow stream 64 is passed to a multi-stage hydrocyclone 60 to remove the residual soluble and insoluble protein from the starch. From the hydrocyclones 60 the pure starch underflow 68 is passed to starch filters and dryers (not shown). The lighter overflow 66 from the hydrocyclones is passed to the middling concentration for further process treatment, if desired.

As pointed out previously it is preferred to use a combination of centrifuges and hydrocyclones in the primary starch-gluten separation station but it is within the scope of the invention to employ centrifuges only in this station, if such is desired.

Looking now to FIGURE 2 which is a modification of the process shown in FIGURE 1, like reference numbers are used to represent the same portions of the process. The basic difference between the process of FIGURE 1 and the process of FIGURE 2 is that the fibre starch stream from the underflow of the screening and washing station 34 is thickened by hydrocyclones 70 and passed directly to hydrocyclones 60 of the second stage of the primary starch-gluten separation station in order to decrease the capacity requirements of the first stage centrifuges 58.

In FIGURE 2 the fibre starch stream 45 at a specific gravity of approximately 4.5° Bé. (100° F.) is fed into a multiplurality of hydrocyclones 70. The less viscous overflow stream 72 is passed to a portion of the centrifuges 40 for mill stream thickening. A portion 74 of the overflow stream 72, preferably, by-passes the centrifuges 40 and is introduced to a collection tank 76 to control the specific gravity of the starch-gluten stream 56 being supplied to the primary separating centrifuges 58. As in FIGURE 1, the starch-gluten stream 56 is at a specific gravity of approximately 11° Bé. (100° F.) As indicated above, underflow 75 from hydrocyclones 70 at a specific gravity of approximately 17° Bé. (100° F.) by-passes the primary separation centrifuges 58 and is supplied directly to the hydrocyclones 60 in the second stage of primary separation.

Referring now to FIGURE 3, like reference numbers represent the same portions of the process as in the preceding figures. The basic difference between the process shown in FIGURE 2 and that shown in FIGURE 3 is that the light fraction overflow stream 72 from the hydrocyclones 70 is supplied to the nozzle type centrifuges 40 as displacement wash water to remove impurities from the gluten and starch particles in the centrifuges. Looking specifically at FIGURE 3 it can readily be seen that the light fraction overflow stream 72 is supplied to centrifuges 40 via a conduit 73.

In the preferred embodiments herein disclosed the process has been designed to deliver a starch-gluten stream to the primary separating centrifuges 58 of a specific gravity of approximately 11° Bé. (100° F.). Obviously though, the equipment and the process, especially in the mill stream thickening station, can be designed and adjusted within reason to obtain a starch-gluten stream supply to the primary separation station of any desired specific gravity within the range of 7° Bé. to 14° Bé. (100° F.).

Our disclosed invention provides many advantages not present in prior art processes. Looking at FIGURES 1 to 3 it can readily be seen that the specific gravity of the mill starch stream supplied to the mill stream thickening centrifuges is considerably lower than the specific gravity of the grit starch stream or the starch-gluten stream being supplied to the primary separation stage. It necessarily follows that the horsepower required by the mill stream thickening centrifuge is considerably lower than what would be required if the grit starch stream was fed directly to these centrifuges. It is therefore obvious that we have provided a process in which the inherent advantage of the use of nozzle type centrifuges in mill stream thickening is taken advantage of without the basic disadvantage of large power consumption due to handling of excessively viscous slurries by the centrifuges.

We also have provided a starch wet mill process in which first cost and power consumption are at a minimum and which provides a constant solids concentration supply to the starch-gluten separation station which has had the majority of the soluble material removed therefrom. Further, the gluten thickening requirements of the gluten obtained from this new and improved starch wet mill process have been economically lessened due to the efficient operation of the mill stream thickening station of the disclosed invention.

A still further advantage of the invention is that a thickened grit-starch stream without loss of solids in the water removed is obtained at reasonable centrifuge power requirement with a lower first cost. In other words, the cost of hydrocyclones plus the cost of mill stream thickening centrifuges of the disclosed process is less than the cost of the mill stream centrifuges for a process which provides the same end result without prethickening. The obvious reason for the lowered cost is that fewer mill stream centrifuges are necessary in our disclosed process and that the cost of additional hydrocyclones is small by comparison to the cost of the additional centrifuges necessary if the hydrocyclones are not employed in the mill stream thickening station of the process. As an example, if five centrifuges requiring 125 H.P. each were employed without prethickening by hydrocyclones the cost of such machines would be approximately $250,000. The same job accomplished in the manner disclosed would cost approximately $190,000. As can be seen in this instance, the improved process resulted in a saving of $60,000 in first cost. The additional saving on the reduction of power consumed obviously would over and above the first initial saving.

Looking at FIGURES 2 and 3 a still further advantage can be seen in that the employment of hydrocyclones to prethicken the fibre starch allows a portion of this stream to by-pass the first-stage centrifuges of the primary starch-gluten separation station and to feed directly to second stage of primary separation thereby reducing the first stage centrifuge requirements.

Although described in detail with particular reference to the preferred embodiments, it is contemplated that other advantages and modifications will become obvious to those skilled in the art and therefore we desire to be limited only to the scope of the invention as defined in the claims.

We claim:

1. The process of manufacturing starch from grain comprising: steeping and comminuting the grain, subjecting the comminuted grain to a wet germ separation to yield a mill starch stream, thickening at least a portion of the mill starch stream by hydrocyclonic action to separate the mill starch stream into a light fraction stream and a heavy fraction stream and by concentrating the light fraction stream by centrifugal action, supplying the heavy fraction stream and the concentrated light fraction stream to a starch-gluten separation station, and separating the thickened mill stream into a gluten stream and substantially pure starch stream.

2. The process of manufacturing starch from grain comprising: steeping and comminuting the grain, subjecting the comminuted grain to a wet germ separation to yield a mill starch stream, separating from the mill starch stream into a grit starch stream having a relatively high solubles content, producing from the remaining mill starch stream a fibre starch stream having a solubles content lower than that of the grit starch stream, separating the grit starch stream by hydrocyclonic action into a light fraction stream and a heavy fraction stream, concentrating the light fraction stream and the fibre starch stream by centrifugal action, supplying the heavy fraction stream and the concentrated light fraction and concentrated starch fibre streams to a starch-gluten separation station, and separating the stream supplied to the starch-gluten separation station into a gluten stream and a substantially pure starch stream.

3. The process of manufacturing starch from grain comprising: steeping and comminuting the grain, subjecting the comminuted grain to a wet germ separation to yield a mill starch stream, separating the mill starch stream into a grit starch stream having a relatively high solubles content and a fibre starch stream having a solubles content lower than that of the grit starch stream, separating the grit starch stream by hydrocyclonic action into a light fraction stream and a heavy fraction stream, concentrating the light fraction stream by centrifugal action, supplying the heavy fraction stream and the concentrated light fraction stream to a primary starch-gluten separation station, controlling the specific gravity of the supply to the separation station with at least a porion of the fibre starch stream, and separating the stream supplied to the separation station into a gluten stream and a substantially pure starch stream.

4. The process of manufacturing starch from grain comprising: steeping and comminuting the grain, subjecting the comminuted grain to a wet germ separation to yield a mill starch stream, separating the mill starch stream into a grit starch stream having a relatively high solubles content and a fibre starch stream having a solubles content lower than that of the grit starch stream, separating the grit starch stream by hydrocyclonic action into a light fraction stream and a heavy fraction stream, concentrating the light fraction stream by centrifuging in a nozzle type centrifuge, concentrating at least a portion of the fibre starch stream by centrifugal action, supplying the heavy fraction stream and the concentrated light fraction and partial fibre starch streams to a starch-gluten separation station, and separating the stream supplied to the starch-gluten separation station in to a gluten stream and a substantially pure starch stream.

5. The process of claim 4 wherein a remaining portion of the fibre starch stream is mixed with the stream being supplied to the starch-gluten separation to provide a feed to the starch-gluten separation station having a predetermined specific gravity.

6. The process of manufacturing starch from grain comprising: steeping and comminuting the grain, subjecting the comminuted grain to a wet germ separation to yield a mill starch stream, separating the mill starch stream into a grit starch stream having a relatively high solubles content and a fibre starch stream having a solubles content lower than that of the grit starch stream, separating the grit starch stream by hydrocyclonic action into a light fraction stream and a heavy fraction stream, concentrating the light fraction stream by centrifuging in a nozzle type centrifuge, separating by hydrocyclonic action the fibre starch stream into a light fraction fibre starch stream and into a heavy fraction fibre starch stream, concentrating a portion of the light fraction fibre starch stream by centrifugal action, supplying the heavy fraction stream and the concentrated light fraction and light fraction fibre streams to a starch-gluten separation station, and separating the streams supplied to the starch-gluten station into a gluten stream and a substantially pure starch stream.

7. The process of manufacturing starch from grain comprising: steeping and comminuting the grain, subjecting the comminuted grain to a wet germ separation to yield a mill starch stream, separating the mill starch stream into a grit starch stream having a relatively high solubles content and a fibre starch stream having a solubles content lower than that of the grit starch stream, separating the grit starch stream by hydrocyclonic action into a light fraction stream and a heavy fraction stream, concentrating the light fraction stream by centrifuging in a nozzle type centrifuge, separating by hydrocyclonic action the fibre starch stream into a light fraction fibre starch stream and into a heavy fraction fibre starch stream, washing the concentrated light fraction stream with the light fraction fibre starch stream, supplying the heavy fraction stream and the concentrated light fraction stream to a starch-gluten separation station, and separating the streams supplied to the starch-gluten station into a gluten stream and a substantially pure starch stream.

8. The process of manufacturing starch from grain comprising: steeping and comminuting the grain, subjecting the comminuted grain to a wet germ separation to yield a mill starch stream, separating the mill starch stream into a grit starch stream having a relatively high solubles content and a fibre starch stream having a solubles content lower than that of the grit starch stream, separating by hydrocyclonic action the fibre starch stream into a light fraction fibre starch stream having a specific gravity lower than the fibre starch stream and into a heavy fraction fibre starch stream having a specific gravity higher than the fibre starch stream, concentrating a portion of the grit starch stream by centrifuging, washing the concentrated portion of the grit starch stream with the light fraction fibre starch stream, supplying the concentrated and washed portion of the grit starch stream to a starch-gluten separation station, and separating the concentrated and washed portion of the grit starch stream into a gluten stream and a substantially pure starch stream.

9. The process of claim 8 wherein the concentrated and washed portion of the grit starch stream is first subjected to a centrifuging action in the starch-gluten separation station to provide an overflow gluten stream and an underflow starch stream, the underflow starch stream being combined with the heavy fraction fibre starch stream and being treated by hydrocyclonic action to remove the residual protein therefrom to provide a substantially pure starch stream.

10. In a grain starch manufacturing plant having mill stream producing means and a primary separation station to separate the starch from the gluten in the mill stream, a mill stream thickening station comprising hydrocyclones connected to receive the mill stream as a feed, centrifuges connected to receive overflow from said hydrocyclones as a feed, and means conducting the respective underflows from said hydrocyclones and said centrifuges to the primary starch-gluten separation station whereby the major portion of the mill stream solids content is by-passed around said centrifuges.

References Cited by the Examiner

UNITED STATES PATENTS

| | | | |
|---|---|---|---|
| 2,307,725 | 1/1943 | Daly et al. | 127—66 X |
| 2,642,185 | 6/1953 | Fontein | 127—71 X |
| 2,778,752 | 1/1957 | Vegter. | |
| 2,798,011 | 7/1957 | Fontein et al. | 127—66 |

OTHER REFERENCES

Brautlecht, Starch, Article "Process in One Outstanding Wet-Milling Corn Starch Factory," pages 200–203 relied upon. Copyright 1953 by Reinhold Publishing Co.

MORRIS O. WOLK, *Primary Examiner.*